United States Patent [19]

Fujio et al.

[11] 3,723,637

[45] Mar. 27, 1973

[54] COLOR TELEVISION SYSTEM INCLUDING ADDITIONAL INFORMATION SIGNALS IN PULSE CODE ON A SPECIAL COLOR BURST

[75] Inventors: Takashi Fujio; Taro Komoto, both of Tokyo, Japan

[73] Assignee: Nippon Hoso Kyokai, Tokyo, Japan

[22] Filed: May 21, 1970

[21] Appl. No.: 39,312

[30] Foreign Application Priority Data

May 22, 1969 Japan ................................44/39449

[52] U.S. Cl. ...........178/5.2 R, 178/5.6, 178/DIG. 23
[51] Int. Cl. ...............................................H04n 9/02
[58] Field of Search....178/5.6, 5.8 R, DIG. 23, 5.2 R

[56] References Cited

UNITED STATES PATENTS

| | | | |
|---|---|---|---|
| 2,671,130 | 3/1954 | Weighton et al. | 178/5.6 |
| 2,624,797 | 1/1953 | Lawson et al. | 178/5.6 |
| 3,534,160 | 10/1970 | Lowenstein | 178/5.4 R |

OTHER PUBLICATIONS

"B.B.C. Sound–In–Vision System" in Wireless World of Jan. 1969, pp. 38 and 39 (no author)

*Primary Examiner*—Robert L. Griffin
*Assistant Examiner*—George G. Stellar
*Attorney*—Stevens, Davis, Miller & Mosher

[57] ABSTRACT

A multiple transmission system of one or more information signals on a color television signal, wherein at least one information signal, such as a voice signal, is sampled and coded to form a coded digital signal representing the information signal. The coded digital signal consists of pulses having a bit frequency and a phase identical with the frequency and the phase of the color burst signal of the color television signal. Successive sample values of said coded digital signal are transmitted during the period of the horizontal blanking signal of the color television signal with the phase of the color burst signal so that the superposed coded digital signal represents also the information of the color burst signal.

6 Claims, 5 Drawing Figures

INVENTOR

BY

ATTORNEY

COLOR TELEVISION SYSTEM INCLUDING ADDITIONAL INFORMATION SIGNALS IN PULSE CODE ON A SPECIAL COLOR BURST

BACKGROUND OF THE INVENTION

1. Field of the Invention

The present invention relates to a multiple transmission system for the transmission of at least one information signal, such as a voice signal, on a color television signal.

2. Description of the Prior Art

In the conventional transmission system used in the transmission of a black and white television signal, various information signals could be transmitted in superposition over the signal by utilizing the period of the horizontal blanking signal. However, in the transmission of a color television signal such multiple transmission is rather difficult, since a standard color television signal contains a color burst signal on the back porch of the horizontal blanking signal for the purpose of synchronization of the phase of the color sub-carrier wave. Accordingly, the applicable period for such multiple transmission of the additional informations is extremely limited in the color television signal transmission.

SUMMARY OF THE INVENTION

The present invention has for its object to realize a novel transmission system, in which one or more information signals, such as a voice signal or the like, may be transmitted on a color television signal by utilizing the period of the horizontal blanking signal.

In accordance with the system of the present invention, a superposing information signal is at first sampled by a frequency which is an integral multiple of the horizontal scanning frequency of the television signal, and then coded to form a coded digital signal representing the sampled information to be transmitted. The coded digital signal consists of pulses having a bit frequency and a phase identical with the frequency and the phase of the color burst signal of the color television signal. Said coded digital signal is once stored in a register and read out in a timing of the color burst signal of the color television signal and transmitted in superposition on the color television signal, in which the original color burst signal has been suppressed. At the receiving end the superposed signal is on one hand utilized to form the color reference signal and on the other hand, is written in a register and read out in the timing of the original sampling and to form the information signal after digital to analog conversion.

The various features and details of the system according to the invention will become clear by referring to the following description with respect to the accompanying drawings.

DESCRIPTION OF THE PREFERRED EMBODIMENTS

As an example of the multiple transmission system according to the present invention, a case of transmitting a voice signal having 15 KHz transmission band on a color television signal will be explained.

Figure 1:
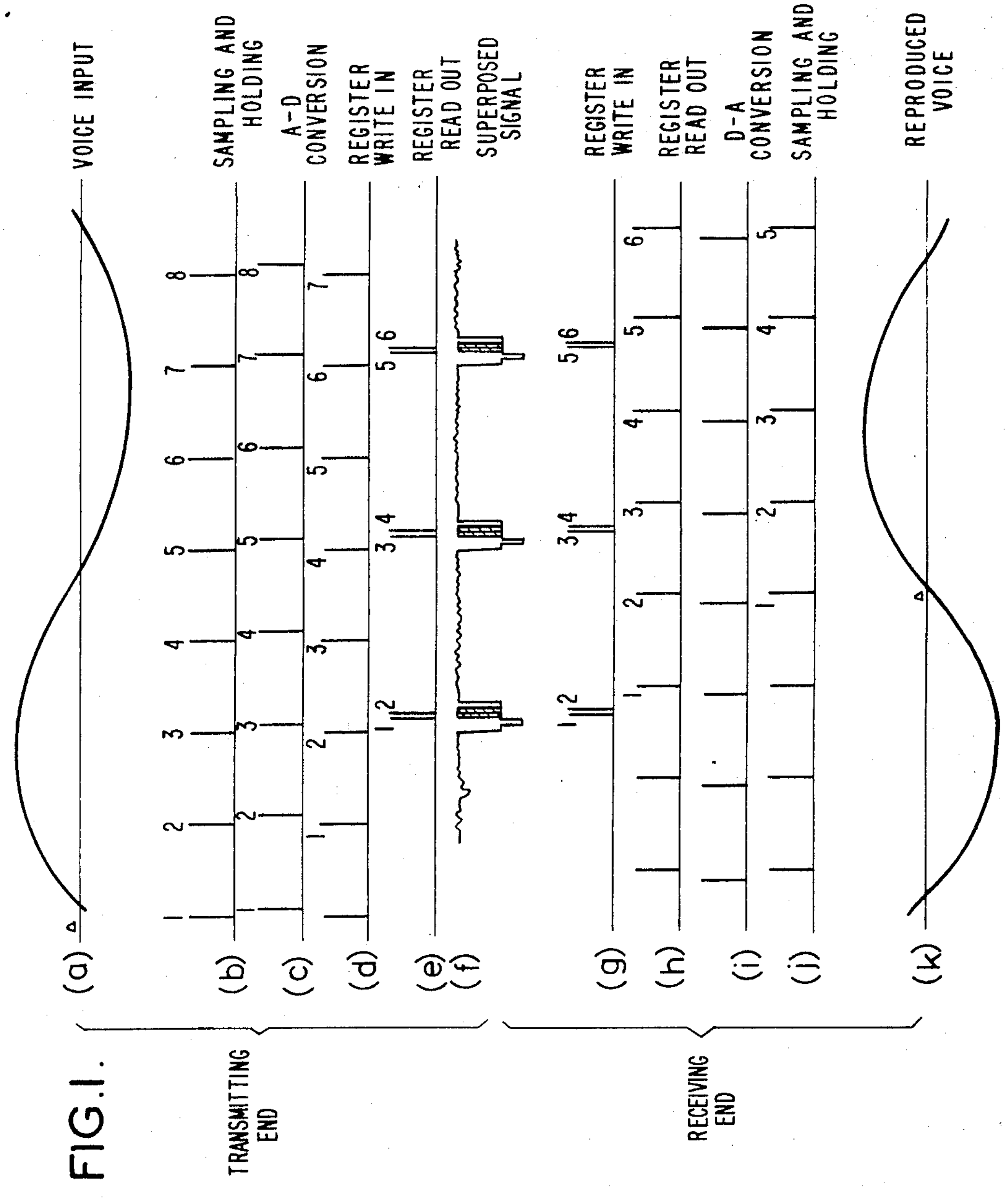
FIG. 1 is an explanation diagram showing the wave form of a transmitting information signal and timing of various coded signals used in the system of the invention.

In FIG. 1, the top line *a* shows a wave form of a voice signal to be transmitted as an additional information signal. This voice signal has a frequency band width up to 15 KHz. In accordance with the present invention, this signal is at first sampled by sampling pulses having a bit repetition frequency, which is an integral multiple of the horizontal scanning frequency of the television signal. In the case of an N.T.S.C. system, the horizontal scanning frequency is 15.73 KHz. As an example, said voice signal is sampled by a pulse series having the bit frequency of 31.46 KHz, which is double the frequency of the horizontal scanning frequency. Since this frequency is nearly double the frequency of the highest frequency of the superposing voice signal having a 15 KHz band width, this sampling frequency is sufficient to transmit the information with a high quality. Each of the sample values is held in the timing sequence shown in the second line *b*. This line shows only the timing sequence of the sampling and does not show the sampled amplitude. Said sampled signal is then converted in an analog to digital (A-D) converter to form a coded digital signal having the timing sequence such as shown in the third line *c*. This signal is then stored in a register in the timing sequence shown in the fourth line *d*. Then the register is read out to derive the coded digital signal in the timing sequence shown in the fifth line *e*, wherein the two successive coded signals, such as, signals 1 and 2 or signals 3 and 4 are located in adjacent position. This signal *e* is read out in an exact timing sequence of the color burst signal and is superposed on the color television signal in the duration of the color burst signal, which has been suppressed from the color television signal.

The coded digital signal *e* is formed by using a pulse series having an exact coincident relationship in the phase and bit frequency with the phase and frequency of the color burst signal, in other words, with those of a standard color subcarrier wave of 3.58 MHz.

Figures 2A, 2B, 2C:
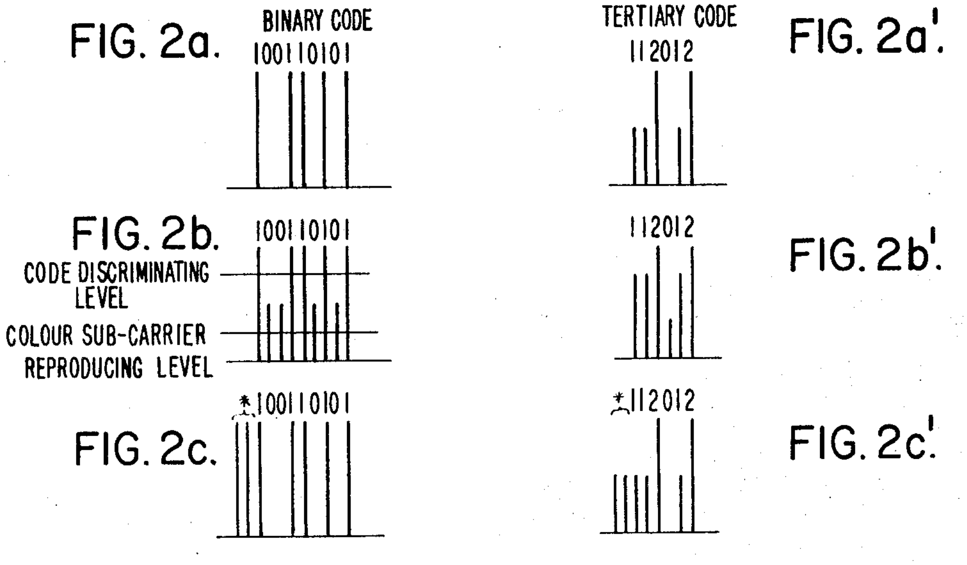
FIG. 2 is an explanation diagram showing several possible patterns of the coded digital signal used in the system of the invention.

FIG. 2 shows several code patterns applicable for coding each signal such as signal 1, 2, . . . in FIG. 1-*c*. Left side column of FIG. 2, i.e., 2-*a*, 2-*b* and 2-*c* show patterns of binary code. The right side column of FIG. 2, i.e., 2-*a'*, 2-*b'* and 2-*c'* show code patterns of ternary code.

The top line of FIG. 2, i.e., 2-*a* and 2-*a'* show examples of standard code patterns. For instance, the code may be 100110101 by a binary code or 112012 in a ternary code. Such standard code may be modified in order to obtain the color reference signal at the receiving end.

The examples shown in the second line of FIG. 2, i.e., 2-*b* and 2-*b'* show examples of such a modified code of a pulse pattern applicable in the present invention. As shown in the drawing, a pulse having a certain amplitude is transmitted in a pulse position corresponding to code position 0 in either the binary code or the ternary code. As will be explained later on such transmitted pulses may be sliced in a certain level indicated as the color sub-carrier reproducing level. Then information representing the phase and frequency of the color burst signal of 3.58 MHz may be obtained at the receiving end. While, by slicing such code groups by a level or levels higher than the above level, for instance, by the level designated in the drawing as code discriminating level, the transmitted code 100110101 can be obtained and treated to form the transmitted information, such as the sampled voice signal.

Figure 4:
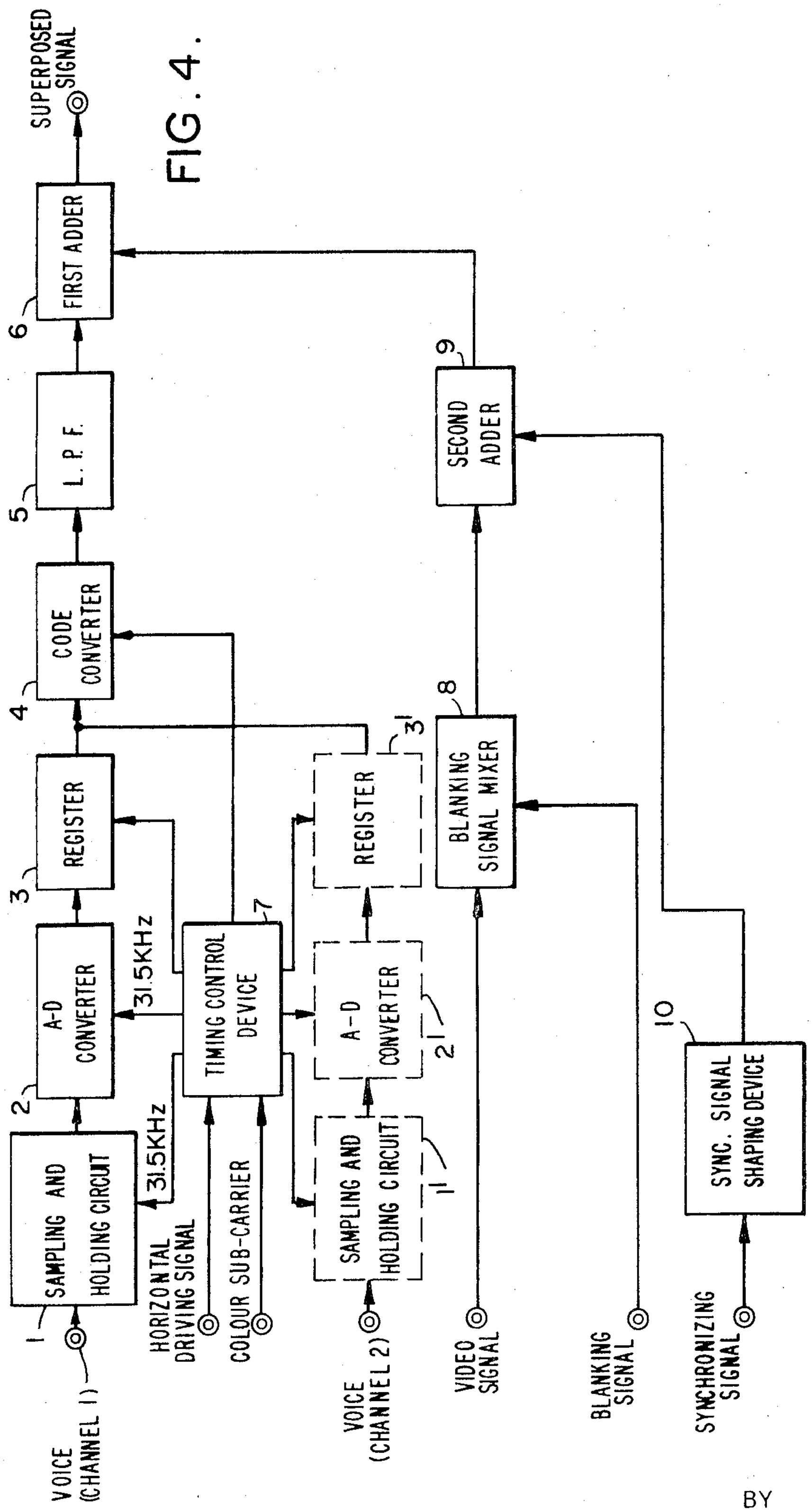
FIG. 4 is a block diagram of an embodiment of a transmitting equipment according to the present invention.

FIG. 4 shows one example of the transmitting equipment for the system of the present invention. As shown in the figure, the superposed information signal, such as, a voice signal is supplied to a sampling and holding circuit 1 and sampled by a series of pulses having the bit frequency of 31.46 KHz, supplied from a timing control device 7, to form the sampled signal shown in the second line *b* of FIG. 1. As explained before the line *b* of FIG. 1 shows only the timing of the signal and does not represent the sampled value. Said sampled signal is then supplied to an analog to digital (A-D) converter 2 to form a coded digital signal having the timing as shown in line *c* of FIG. 1. Each said signal *c* has a coded pattern for instance shown in FIG. 2-*a* or 2-*a'*. These code patterns are formed by pulse series having the bit frequency of 3.58 MHz, which is the frequency of the color reference signal. Also, the pulse series must have an exact phase of the color reference signal. The code pattern applicable in the present invention has no particular limitation. Either of the binary or the ternary code may be used. The digital signal *c* is sent to a register 3 and stored therein with the timing shown in line *d* of FIG. 1. Said register 3 is read out in a timing shown in FIG. 1-*e* and the derived signal is sent to a code converter 4. In the code converter 4, the digital signal is further treated to form a modified digital code suitable for the transmission of the color burst information such as shown in FIG. 2-*b* or 2-*b'*. For instance, FIG. 2-*b* shows a word of binary code in which each of the 0 positions has a certain pulse amplitude.

The timing of the above devices, such as sampling and holding circuit 1, analog to digital converter 2, register 3 and the code converter 4 is controlled by a timing control device 7. The device 7 is controlled by the horizontal driving signal and the standard color subcarrier wave in the transmitting device.

In the code converter 4 the coded digital signal is treated as mentioned above to apply necessary modification and is also converted into a form suitable for the superposition and then supplied to an adder 6 via a low pass filter 5. In the adder 6, the coded digital signal having the timing as shown in FIG. 1-*e* is superposed on a television signal, supplied from second adder circuit 9. In the above television signal, the ordinary color burst signal is suppressed as described hereinafter. For obtaining this signal, the video signal and the blanking signal are mixed in a blanking signal mixer 8 to form a color television signal which does not include the color burst signal. A synchronizing signal shaping device 10 fed by the horizontal synchronizing signal supplies the necessary synchronizing shaping signal to the second adder 9. The resultant superposed signal obtained from the adder 6 is generally shown in FIG. 1-*f*.

Figure 3:
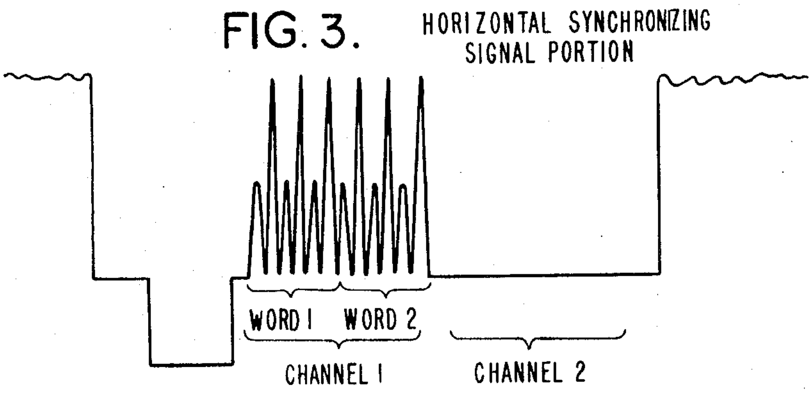
FIG. 3 shows a wave form of a horizontal blanking signal of the transmitting signal.

FIG. 3 is an extremely enlarged signal of the portion of a horizontal blanking signal. In the back porch of the signals, coded digital signal corresponding for instance, to word 1 and word 2 of channel 1, are superposed and transmitted. Since there is a considerable duration for this back porch, other coded digital signals in channel 2 may be superposed.

FIG. 2-*c* or 2-*c'* shows modified embodiments of the coded digital signal. Both of these pulse codes contain one or two additional auxiliary pulses at the start of the coded word as shown by an asterisk in the drawing. By these additional auxiliary pulses, the phase information of the color burst signal is sufficiently transmitted. By this means the necessary pulses for transmission of the information of the phase of the color burst exist always in the front of the coded digital signal so that the coded digital signal is not required to add modification. Moreover, in this form of modified code, the auxiliary pulses may be utilized also for an indication of the beginning of each of the coded words at the time of the decoding.

As a more simple method, the original coded signal shown in FIG. 2-*a* or 2-*a'* may be used directly, by using a code in which a code (00 . . . 00) corresponds to the minimum voice level $-V_A$ and a code (11 . . . 11) corresponds to the maximum voice level $+V_A$. This is based on the following reason. The pulse pattern representing a voice information varies according to the variation of the level of the voice information. By selecting the above pulse pattern, the probability of occurrence of the pulse code (00 . . . 00) can be reduced to an extremely small value, since the probability of occurrence of either the minimum level $-V_A$ or the maximum level $+V_A$ is very small.

By the very small probability of occurrence of pulse code (00 . . . 00), the color burst signal may be reproduced by directly passing the received pulses to a color burst signal reproducing circuit including an automatic phase control circuit of very narrow response frequency range.

In the case of a voice signal, it is also possible to make a coded signal, wherein no voice or silent portion is represented by a code of (11 . . . 11) so that the number of code 1 is increased in the vicinity of 0 volt level. This makes the reproduction of a color burst signal very easy.

In FIG. 2 the codes are all shown as mono-polar pulses. It is also possible to use bi-polar pulses in which 0 being the negative direction and 1 being the positive direction. In this case, 0 and 1 pulses are both sliced and added after the polarity conversion. By this means always a pulse exists in all of the pulse code position. Thus the reproduction of the color burst signal is very easy. This is same as the case of code pattern of FIG. 2-*b*, but is more advantageous in view of the bandwidth of the pulses.

The reproduction of the received superposed signal at the receiving end will now be described.

Figure 5:
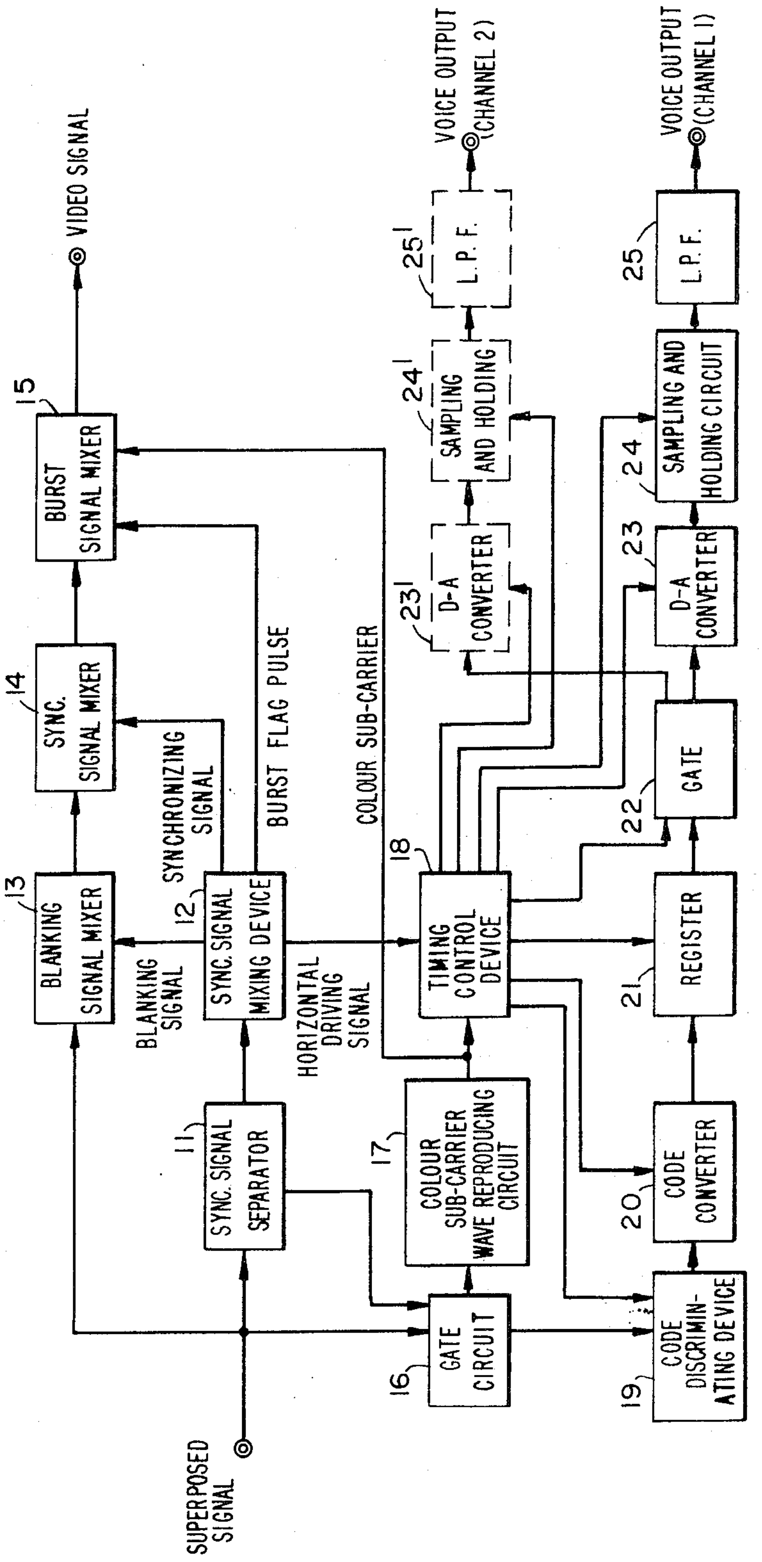
FIG. 5 is a block diagram showing one embodiment of a receiving equipment according to the present invention.

FIG. 5 shows a practical embodiment for the receiving equipment used in conjunction with the transmitting equipment shown in FIG. 4. In the receiving equipment, the superposed signal having the wave form shown in FIG. 1-*f* is supplied to a synchronizing signal separator 11 via the input terminal. In the synchronizing signal separator 11 the synchronizing signal is separated and a series of gate pulses obtained from the synchronizing signal is supplied to a gate circuit 16 and the received coded digital signal is gated out in the gate circuit 16 from the superposed signal. By using the gated out coded signal a standard color sub-carrier wave is reproduced in a color sub-carrier wave reproducing circuit 17. Also, the gated out coded digital signal having wave form *g* is supplied to a code discriminating device 19 in which the code is discriminated and then supplied to a code converter 20. In the code converter 20, the modification applied for the coded words in the transmitting end is reformed and then retained in a register 21 to hold the coded word groups for a period. This register 21 is read out to derive each coded word in exactly the same sampling sequence and interval has the time of sampling at the transmitter end. The read out signal is shown in FIG. 1-*h* and supplied to a digital to analog (D-A) converter 23 via a gate circuit 22 to obtain a decoded analog signal, which is in turn supplied to a sampling and holding circuit 24. This circuit 24 is inserted to perfectly reshape the transmitted information. Then this signal is supplied to a low pass filter 25 to form a reproduced wave form shown in FIG. 1-*k*. The triangle mark shown at the reproduced voice signal *k* shows the reproduced timing of the input voice signal in which the corresponding portion is marked accordingly.

The timing of each of the devices 19 – 24 is controlled by a timing controlling device 18, which is supplied from the color sub-carrier wave reproducing circuit 17 and is also supplied from synchronizing signal reproducing circuit 12. FIGS. 1-*g* to 1-*j* show the timing from the writing into the register up to the sampling and holding as described above.

The reproduction of the superposed voice signal and reproduction of the color burst signal are carried out in an exactly reverse manner to the process carried out in the transmitter side. The correspondences of each of the signals are as follows:

$$(g) \rightarrow (e)$$

$$(h) \rightarrow (d)$$

$$(i) \rightarrow (c)$$

$$(j) \rightarrow (b)$$

The synchronizing signal separated in the synchronizing signal separator 11 is supplied to synchronizing signal mixing device 12. From this device 12 the blanking signal is supplied to a blanking signal mixer 13, and synchronizing signal to a synchronizing signal mixer 14 and burst flag pulses to a burst signal mixer 15, horizontal driving signal to the timing control device 18. The color sub-carrier wave derived from the color sub-carrier wave reproducing circuit 17 is supplied to the burst signal mixer 15 to reproduce a video signal in the video signal output.

If two voice information signals are to be superposed on the color television signal, additional circuits shown by the dotted line in FIGS. 4 and 5 are to be added for the second voice channel. In FIG. 4, the second voice channel information is supplied to a sampling and holding circuit 1′, then to an analog to digital converter 2′ and a register 3′ and treated in the same manner as channel 1. In FIG. 5 a digital to analog converter 23′, a sampling and holding circuit 24′ and a low pass filter 25′ are to be added in order to obtain the voice output in the channel 2.

If the duration of the back porch of the horizontal blanking signal is insufficient for such superposition, a horizontal synchronizing signal having narrower pulse width may be produced in the synchronizing signal shaping device 10 in the transmitter thus to obtain a horizontal blanking signal having a longer duration in the back porch portion. By this means a sufficient time interval for superposing voice informations in two channels may be obtained effectively.

According to the present invention the various information signals to be transmitted are coded by using a digital pulse code and the coded pulses also represent the information for color synchronization reference, therefore the blanking period of a television signal, more especially the duration of the burst signal can be utilized very efficiently and the additional informations may be transmitted in the same transmission channel. For instance, two channels voice of information each having a 15 KHz bandwidth, each of which is coded into a 9 bit digital signal, so as to obtain an SN ratio of 55 dB may be superposed on the color television signal.

Not only the voice signals used in conjunction with the television signal but any kind of notations or characters may be transmitted in superposition on the signal. Therefore, various utilizations of the system according to the present invention may be considered. For instance, such informations as facsimile, weather broadcasting, news, trafic information, data transmission and much other additional information may be transmitted in superposition on a color television signal.

In accordance with the present system of the invention, the transmission path for the color television signal may be utilized also for the transmission of the additional information, therefore an advantage of avoiding the use of separate transmission paths can be obtained.

The present system is particularly suitable for satellite transmission of the multiple color television signal.

What is claimed is:

1. A multiple transmission system color television signal comprising information signal on a composite color television signal comprising a baseband luminance component, chrominance components modulated on a chrominance subcarrier, and a horizontal blanking signal containing a horizontal synchronizing signal at a predetermined horizontal scanning frequency and a color reference subcarrier wave in the form of a color burst signal for use in reproducing said chrominance components, said system comprising:

sampling means for sampling said information signal with a pulsed sampling signal having a repetition frequency which is an integral multiple of the horizontal scanning frequency of said color television signal to produce a sampled information signal;

holding means successively holding sampled information signals for the period of said sampling signal;

converting means for converting the sampled signals held in said holding means into a coded digital signal having a repetition frequency and phase substantially equal to the frequency and phase of the color reference subcarrier wave of said color television signal;

modifying means for superimposing constant amplitude pulses having the same phase and frequency of said color burst with said coded digital signal to produce a modified coded digital signal containing sufficient information to replace said color bust signal;

coupling means connecting the output of said converting means to the input of said modifying means;

suppressing means for suppressing said color burst signal from said color television signal;

superimposing means for superimposing said modified coded digital signal onto said color television signal in the space of the suppressed color burst signal; and transmitting means for transmitting the signal produced by said superimposing means so that the only information transmitted containing sufficient information to replace said color burst signal is contained within said modified coded digital signal.

2. A transmission system as defined in claim 1, wherein the repetition frequency of said sampling signal is twice that of said horizontal scanning frequency.

3. A transmission system as defined in claim 1, wherein said coupling means comprises:

register means connected to the output of said converting means for storing said coded digital signal; and readout means connected to said register means for reading out the coded digital signals stored in said register means as a function of the timing of said color burst signal.

4. A transmission system as defined in claim 1, further comprising:

receiving means for receiving said color television signal transmitted by said transmitting means;

synchronizing signal separating means connected to said receiving means for separating the synchronizing signal from the received color television signal;

gate circuit means having a first input connected to said receiving means and a second input connected to an output of said synchronizing signal separating means for separating said modified coded digital signal from said received color television signal as a function of the timing of said synchronizing signal;

generating means connected to the output of said gate circuit means for reproducing said color subcarrier wave from said modified coded digital signal;

further modifying means coupled to the output of said gate circuit means for converting said modified coded digital signal back to said coded digital signal;

storing means connected to said further modifying means for storing said coded digital signal;

readout means for reading out the signal stored in said storing means in a sequence corresponding to that of the said information signal;

further converting means for converting the readout signals from said readout means into a train of amplitude modulated pulse signals; and reproducing means for reproducing said at least one information signal from said train of amplitude modulated pulse signals, said reproducing means including a low-pass filter.

5. A transmission system as defined in claim 1 adapted to transmit a second information signal within said modified coded digital signal, further comprising:

second sampling means for sampling said second information signal;

second holding means for successively holding second sampled information signals;

second converting means for converting said second sampled signals held in said second holding means into a second coded digital signal; and combining means for combining said coded digital signal and said second coded digital signal into a composite coded digital signal, said composite signal being thereafter applied to said modifying means.

6. A transmission system as defined in claim 5, further comprising:

receiving means for receiving said color television signal transmitted by said transmitting means;

synchronizing signal separating means connected to said receiving means for separating the synchronizing signal from the received color television signal;

gate circuit means having a first input connected to said receiving means and a second input connected to an output of said synchronizing signal separating means for separating the composite modified coded digital signal from said received color television signal as a function of the timing of said synchronizing signal;

generating means connected to the output of said gate circuit means for reproducing a color subcarrier wave from said composite modified coded digital signal;

further modifying means coupled to the output of said gate circuit means for converting said modified composite coded digital signal back to said composite coded digital signal;

storing means connected to said further modifying means for storing said composite coded digital signal;

readout means for reading out the signal stored in said storing means in a sequence corresponding to that of the sampled information signal;

separating means for separating said coded digital signal and said second coded digital signal out of said composite coded digital signal read out of said readout means;

first and second further converting means for converting the separated coded digital signals, respectively, into first and second trains of amplitude modulated pulse signals; and first and second reproducing means for reproducing said at least one information signal and said second information signal, respectively, from said first and second trains of amplitude modulated pulse signals.

* * * * *